Patented Jan. 14, 1941

2,228,271

UNITED STATES PATENT OFFICE 2,228,271

POLYMERIC PRODUCT OF FORMALDEHYDE AND AN AMINO - HYDROGEN - BEARING AMINONITRILE

Ralph Albert Jacobson, Landenberg, Pa., and Charles Joseph Mighton, Wilmington, Del., assignors to E. I. du Pont de Nemours & Company, Wilmington, Del., a corporation of Delaware No Drawing. Application April 11, 1939, Serial No. 267,332

9 Claims. (Cl. 260—72)

This invention relates to new polymeric products and more particularly to resinous products soluble in dilute acids.

This invention has as an object the provision of a process for the preparation of polymeric materials. A further object is the class of materials so produced. Another object is the preparation of new coating compositions. A further object is the preparation of resins. A still further object is the improvement of organic fibrous materials with respect to water and oil repellency, dyeing properties, and the like. Other objects will appear hereinafter.

These objects are accomplished by the following invention wherein formaldehyde is reacted with an amino-hydrogen-containing aminonitrile, preferably an amino-hydrogen-containing polyaminopolynitrile, and particularly an aliphatic dinitrile in which the nitrile groups are separated by an open chain of atoms containing different secondary amino groups removed from each nitrile group by a single carbon atom, i. e., the amino groups are in the alpha position to the nitrile groups. Alternatively, these aminonitriles may be designated as N,N'-bis-(1-cyanoalkyl)-aliphatic polyamines having at least two secondary amino nitrogens. Graphically, the majority may be represented as of the formula

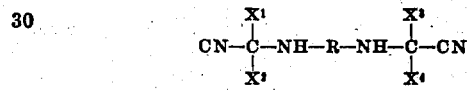

in which the X's are alkyl radicals or hydrogen and R is a divalent acyclic radical having a chain having at least two carbons between and contiguous with the amino nitrogens. Preferably R is hydrocarbon, especially polymethylene, but it may contain hetero chain atoms, particularly nitrogen. Such nitrogens may have their third valence satisfied by 1-cyanoalkyl groups or by hydrogen.

The products obtained by the above-stated reaction are polymeric materials of unknown structure which are soluble in dilute aqueous acids and organic solvents and usually insoluble in water and dilute alkalis, range from flowable to balsamic to tough, rubbery materials depending on reactants and conditions, and are useful for many purposes, for example, as components of coating and plastic compositions. Those from the above-mentioned class of aliphatic dinitriles are the more valuable since they are more highly condensed, less sensitive to water, lighter colored and form tougher films.

The aminonitriles used as reactants may be prepared in any suitable manner. Many methods will be found in the literature for making the simpler types. The less well known aliphatic dinitriles of the above formula may be made by reacting aliphatic polyprimary polyamines having at least two primary amino groups with a cyanhydrin (i. e., the addition product of HCN and an aldehyde or ketone) which may if desired be prepared in situ from hydrogen cyanide and the aldehyde or ketone. Suitable specific aminonitriles may be made as follows (parts are by weight):

Example A

One hundred seventy parts (2.0 mols) of acetonecyanhydrin is added with stirring to 116 parts (1.0 mol) of hexamethylenediamine, the temperature being maintained below 50° C. by external cooling. The mixture, which soon solidifies, is allowed to stand overnight and is then ground and washed thoroughly with cold water, dried, and recrystallized from petroleum ether. The product obtained in 90% yield, is 2,2,11,11-tetramethyl-3,10-diazododecanedicarboxylonitrile of the formula

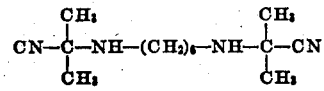

It melts at 67° C. and is a colorless crystalline solid.

Example B

Thirty-two parts (0.375 mol) of acetonecyanhydrin is added to 27 parts (0.125 mol) of dihexamethylenetriamine. After standing overnight, a dark-colored, viscous product is obtained. It is washed with 200 cc. of water to remove unreacted material, and is then dried under vacuum. The resulting light-colored oil is crude 2,2,18,18-tetramethyl-3,10,17-triazo-10-(1-cyano-1-methylethyl) nonadecanedicarboxylonitrile.

Example C

Eighty-five parts (1 mol) of acetonecyanhydrin is added slowly to 51.5 parts (0.5 mol) of diethylenetriamine while cooling externally, and the mixture is allowed to stand for 18 hours. A viscous amber-colored oil separates. This material, which may be used as such in the present invention, is crude 2,2,10,10-tratramethyl-3,6,9-triazaundecanedicarboxylonitrile.

Other suitable aminonitriles may be made similarly from other cyanhydrins and diprimary diamines.

In putting the present invention into practice, the aminonitrile, which may be crude but is preferably substantially pure, is reacted, i. e., brought into contact with formaldehyde, preferably aqueous, at room temperature or in some cases at slightly elevated temperatures, and preferably in the absence of catalyst or organic diluent. A mild exothermic reaction takes place and results in the formation of light-colored, soft, rubber-like polymers which coagulate and precipitate from the aqueous solutions and are purified by washing with cold 95% alcohol and water, followed by drying in vacuo. However, unless R of the general formula above is or contains a relatively long hydrocarbon chain, i. e., a chain of about four or more carbons, viscous liquid polymers are at first obtained which are water-soluble and remain in solution. Further reaction or polymerization may be effected in such instances by careful evaporation of water under reduced pressure, or the aqueous solution may be utilized per se as a coating or impregnant under conditions which cause further reaction and removal of water.

The more detailed practice of the invention is illustrated by the following examples, wherein parts given are by weight. There are of course many forms of the invention other than these specific embodiments.

*Example I*

To 100 parts (0.4 mol) of 2,2,11,11-tetramethyl-3,10-diazadodecanedicarboxylonitrile, obtainable as in Example A above, is added with stirring 130 parts (1.6 mols) of aqueous 37% formaldehyde. During the course of about 5 minutes at 22–40° C., the mixture becomes clear and homogeneous and then turbid as a white, soft, rubber-like polymer precipitates. The latter product is ground and washed first with 95% ethyl alcohol and then with water, and is finally dried in vacuo. Analysis of the resin gives the following results: N=19%, H=9.38%, C=62.14%. This resin is insoluble in water and 2% aqueous ammonia, but soluble in dilute aqueous acids such as 5% hydrochloric acid and acetic acids. It is also soluble in many organic solvents, among them dioxan, butyl acetate, ethyl acetate, chloroform, dioxan-isobutanol mixtures, and toluene-ethanol mixtures. Flowouts of the resin dry tack-free in ten minutes at 100° C. or in two hours in air at 20–30° C. Films of the resin baked for one hour at 120° C. are light-colored, tough, flexible, and adhesive, and show good water and alkali resistance. The resin is heat-hardening, and on baking it becomes insoluble in organic solvents. The resin is compatible with kauri and Manila copals, rosin, dammar, shellac, cellulose acetate, and nitrocellulose, and with urea-formaldehyde, phenol-formaldehyde, and alkyd resins. A mixture of 2 parts copal with 3 parts of this aminonitrile resin in butyl acetate solution gives a coating composition, which, after baking one hour at 100° C., produces light-colored, hard, tough, flexible films which adhere well to glass and metal surfaces and possess good water and alkali resistance.

*Example II*

To 12.24 parts (0.04 mol) of 2,2,15,15-tetramethyl-3,14-diazahexadecanedicarboxylonitrile, M. P. 51–52° C., obtainable by reacting two mols of acetonecyanhydrin with one mol of decamethylenediamine according to the method of Example A above, is added 12.8 parts (0.16 mol) of 37% aqueous formaldehyde. The reactants are thoroughly mixed in the cold and then warmed at a temperature of 75° C. until the precipitation of a white, rubber-like solid resin from solution is complete. The resin is then washed as in Example I and dried in vacuo. This product is soluble in dioxan, butyl acetate, toluene-alcohol mixtures, and dilute aqueous acids, and is insoluble in water. Flowouts from dioxan solution dry rapidly at 110° C., and, after baking one hour, clear, tough, flexible, and adhesive films are obtained. The baked films show good resistance to water and alkaline solutions and are insoluble in dioxan. The resin is compatible with copals, rosin, nitrocellulose, urea-formaldehyde resins, chlorinated rubber, and oil-modified alkyd resins.

*Example III*

Eight parts (0.1 mol) of 37% aqueous formaldehyde is added to 19.4 parts (0.1 mol) of 3,10-diazadodecanedicarboxylonitrile, M. P. 30–31° C., obtainable by reacting two mols of glycolonitrile with one mol of hexamethylenediamine according to the method of Example A above. A light-colored, soft, rubber-like, dilute acid-soluble, water-insoluble polymer coagulates and precipitates from solution almost immediately. This resin is washed with water and dried in vacuo. Flowouts from dioxan solution dry on baking, though somewhat more slowly than the resins of Examples I and II, to give light-colored, tough, flexible films which are resistant to water and aqueous alkaline solutions.

*Example IV*

To 11 parts (0.027 mol) of 2,2,18,18-tetramethyl-3,10,17-triaza-10-(1-cyano-1-methylethyl)nonadecanedicarboxylonitrile, obtainable according to Example B above, is added 15 parts (0.185 mol) of aqueous 37% formaldehyde. After a short time, a solid, soft, rubber-like resin precipitates from solution. It is soluble in dilute aqueous acids and a number of organic solvents, and insoluble in water. Flowouts from dioxan solution dry tack-free in 10 minutes at 105° C., and, after baking one hour, a clear, amber-colored, tough, pliable film insoluble in dioxan is obtained.

*Example V*

Eight parts (0.1 mol) of aqueous 37% formaldehyde is added to 5.5 parts (0.025 mol) of 2,2,9,9-tetramethyl-3,8-diazadecanedicarboxylonitrile, M. P. 74–76° C. A mild exothermic reaction proceeds with the formation of a viscous, syrupy resin which is insoluble in water but soluble in dilute aqueous acids and in organic solvents such as dioxan. Films of the resin flowed from dioxan and baked at 120° C. are tough and flexible and adhere well to glass.

*Example VI*

To 28.2 parts (0.1 mol) of crude 2,2,10,10-tetramethyl-3,6,9-triazaundecanedicarboxylonitrile, obtainable according to Example C above, is added 40 parts (0.5 mol) of 37% aqueous formaldehyde. A mild exothermic reaction takes place with the formation of a light-colored viscous resin, which is isolated by evaporating off excess formaldehyde and water. This resin is soluble in water, dioxan, or 5% aqueous acetic acid.

*Example VII*

To 18 parts (0.05 mol) of 2,2,10,10-tetramethyl-3,6,9-triaza-6-(1-cyano-1-methylethyl)undecanedicarboxylonitrile, obtainable by reacting 3 mols of acetonecyanhydrin with one of diethylenetriamine, is added 28 parts (0.35 mol) of 37% aqueous formaldehyde. A dark-colored, viscous, resin is obtained by evaporating off the water from the reaction mixture. This resin is soluble in water, dioxan, and dilute aqueous hydrochloric acid.

*Example VIII*

Nine and six-tenths (9.6) parts (0.12 mol) of 37% aqueous formaldehyde is added to 5.8 parts (0.03 mol) of 2,2,7,7-tetramethyl-3,6-diazaoctanedicarboxylonitrile, obtainable from acetonecyanhydrin and ethylenediamine. After the mild exothermic reaction subsides, a clear, light-colored, viscous, resinous material is isolated by evaporating off the water. The product is soluble in water, dilute aqueous lactic acid, and dioxan. This resin dries on baking to a dark-colored, hard film.

*Example IX*

Thirty-two parts (0.4 mol) of 37% aqueous formaldehyde is added to 27.9 parts (0.1 mol) of 2,11-dimethyl-2,11-diethyl-3,10-diazadodecanedicarboxylonitrile, M. P. 56–58° C., obtainable from hexamethylenediamine and methyl ethyl ketonecyanhydrin, and the mixture warmed and stirred on the steam bath for 30 minutes. A light-colored, viscous resin precipitates from solution. This resin is insoluble in water but readily soluble in dioxan, butyl acetate, acetone, and 5% and 10% aqueous acetic acid. Films of the resin, after baking one hour at 105° C., are tough, flexible, and essentially colorless, and are not readily affected by water or aqueous alkaline solutions.

The formaldehyde used in the present invention may be in the form of aqueous or gaseous formaldehyde, paraformaldehyde, or any material, such as hexamethylenetetramine, which liberates formaldehyde under the reaction conditions. The term "formaldehyde," unless otherwise qualified, is used herein to include all such materials.

As already indicated, the aminonitriles suitable for use in the present invention may be any aminohydrogen-containing aminonitrile, including any aliphatic compound containing two nitrile (CN) groups separated by an open chain of atoms containing, in the chain and removed from the nitrile groups by a single carbon, two secondary amino nitrogens. Suitable specific amino nitriles in addition to those of the examples are as follows:

2,2,8,8-tetramethyl - 3,7 - diazanonanedicarboxylonitrile
2,9-dimethyl-2,9-diethyl - 3,8 - diazadecanedicarboxylonitrile
2,2,10,10-tetramethyl-3,9-diazaundecanedicarboxylonitrile
2,10-dimethyl-2,10-diethyl-3,9-diazaundecanedicarboxylonitrile
2,2,10,10-tetraethyl-3,9 - diazaundecanedicarboxylonitrile
2,2,13,13-tetramethyl - 3,12 - diazatetradecanedicarboxylonitrile
2,13 - dimethyl-2,13-diethyl - 3,12 - diazatetradecanedicarboxylonitrile
3,14-diazahexadecanedicarboxylonitrile
2,15-dimethyl-3,14-diazahexadecanedicarboxylonitrile
2,15-diethyl-3,14-diazahexadecanedicarboxylonitrile
2,2,13,13-tetramethyl - 3,6,9,12 - tetraazatetradecanedicarboxylonitrile
aminoacetonitrile
α-aminoisobutyronitrile
α-aminopropionitrile
α-(N-methylamino) isobutyronitrile
N-phenylaminoacetonitrile
α-(N-ethylamino) propionitrile
α-(β-chlorocetylamino) isobutyronitrile
α-(ethylamino) -α- (chloromethyl) propionitrile
α-(β-ethoxyethylamino) isobutyronitrile
α-(β-ethylthioethylamino) isobutyronitrile
2,2,10,10-tetramethyl-3,9-diaza-6 - oxaundecanedicarboxylonitrile
2,2,10,10-tetramethyl-3,9-diaza-6-thioundecane - dicarboxylonitrile
α-(cyclohexylamino) isobutyronitrile
α-(tetrahydrofurfurylamino) isobutyronitrile
α-(allylamino) isobutyronitrile When the nitrile is of such nature that it can be purified readily, it is preferable to employ such purified material since the resulting resins are lighter in color. However, it is not necessary that the aminonitrile be used in the pure state to obtain valuable products. Thus, 2,2,11,11-tetramethyl - 3,10 - diazadodecanedicarboxylonitrile, which has not been purified by recrystallization as in Example I, may be treated with formaldehyde to yield a soft rubber-like resin which is somewhat discolored, but otherwise closely resembles the resin prepared from purer reactants.

While not essential, organic solvent media may be used, if desired, in preparing the products of the present invention. Thus, 2,2,11,11-tetramethyl-3,10-diazadodecanedicarboxylonitrile may be reacted with an isobutanol solution of paraformaldehyde, and a viscous solution of the resin is obtained. In place of isobutanol other organic solvents such as dioxan, chloroform, and butyl acetate, as well as mixtures of solvents such as dioxanisobutanol, toluene-ethanol, and butyl acetate-ethanol, may be used. The clear, viscous, resin solutions obtained may be used as such for coating and other purposes, or, if desired, the resins may first be isolated by evaporation of the solvent.

The condensation of the aminonitriles with formaldehyde may also be conducted in the presence of acidic or basic catalysts, but this procedure often causes darkening of the resinous products. The reaction is therefore preferably conducted under substantially neutral conditions. In some cases, as in Example II, it is desirable to conduct the condensation at slightly elevated temperatures, but further heating of the reactants tends generally only to speed up the reaction slightly since in most cases the condensation is exothermic and spontaneous at room temperatures. In practically all instances, temperatures below 100° C. will be required if undue discoloration of the resinous products is to be avoided. However, it is possible as a rule to operate in the approximate range of 10–100° C.

The ratio of formaldehyde to aminonitrile may be varied over wide limits. However, when 4 mols or more of formaldehyde are used to 1 mol of the aminonitrile, the resinous products are in many instances superior in many respects to those obtained when smaller amounts of formaldehyde are employed. Thus, in the case of 2,2,11,11-tetramethyl - 3,10 - diazadodecanedicarboxylonitrile, a solid, rubber-like polymer is obtained when four or more mols of formaldehyde are reacted with one mol of the nitrile. Light-colored, syrupy to balsamic condensation products are obtained when lesser amounts are employed. In the case of the aminonitrile used in Example IV, a solid rubber-like resin is obtained when seven or more mols of formaldehyde are reacted with one mol of the nitrile, although polymeric products are nevertheless obtained when smaller amounts of formaldehyde are used. It is not to be assumed from this discussion that the invention is limited to the proportions of reactants mentioned, or to those given in the examples. It is possible to obtain polymeric products by varying the ratios of formaldehyde to aminonitrile over wide limits.

The properties of these resinous products may be further modified by conducting the reaction in the presence of any other material capable of reacting with formaldehyde to form a resinous product. Such materials include phenols, amines, ureas, thioureas, certain proteins, guanidines, carboxylic and sulfonic acid amides, and the like. Thus 0.3 mol of aqueous 37% formaldehyde may be reacted with 0.1 mol of urea and 0.05 mol of 2,2,11,11-tetramethyl - 3,10 - diazadodecanedicarboxylonitrile to obtain a clear, aqueous solution from which hard films are obtained on baking. In place of urea, dimethylolurea may be used and films are obtained which, after baking, are hard and pliable, and possess fair water resistance.

The resins described herein are useful as components of plastic and coating compositions. In most cases, flowouts from organic solvent solutions set up quickly on baking to give light-colored, tough, flexible, and adhesive films which are ordinarily not readily affected by water or alkaline solutions. Due to the rubber-like nature of these films, they exhibit unusually good resistance to marring and permanent disfiguration. The resins of the present invention may be blended with many natural or synthetic resins and polymeric materials, such as copals, rosin, shellac, dammar, cellulose acetate, nitrocellulose, alkyd resins, urea-formaldehyde resins, and phenol-formaldehyde resins. Due to the wide selection of natural and synthetic resins with which they are compatible, the products of the present invention may often be used as plasticizers for resins which are alone too brittle for coating compositions or other uses.

The water-insoluble resins of this invention may be applied to paper for the purpose of increasing transparency and of imparting water and oil repellency. They may also be applied to fabrics for the latter purposes. The dyeing properties of cellulose acetate are greatly improved by incorporating 10% or less of the present resins therein; also these resins are frequently excellent fixatives in general for direct dyes. They may further be used to anchor moistureproofing lacquers to "Cellophane." When incorporated in small amounts in lubricating oils, they are useful as corrosion and sludge inhibitors. In general, the products of the present invention are a new and valuable class of dilute aqueous acid-soluble, amino-nitrogen-containing polymeric materials, and may be used for the purposes for which other such materials have been used, as for instance, those disclosed in U. S. P. 2,122,707, line 11, column 2, page 4 through line 9, column 1, page 5.

The course of the reaction in the present resin condensation is believed to be quite different from the ordinary amine-aldehyde reaction. Certain significant facts have been observed which demonstrate that the reaction is not at all simple. Thus, although resins may be obtained with less, four mols of formaldehyde are needed for the complete consumption of one mol of 2,2,11,11-tetramethyl - 3,10 - diazadodecanedicarboxylonitrile, whereas only two mols at the most would be expected to be required since the compound has only two amino hydrogens. In addition, acetone is liberated during the reaction with the nitrile just mentioned, one mol of acetone per mol of nitrile being obtained.

The above description and examples are intended to be illustrative only. Any modification of or variation therefrom which conforms to the spirit of the invention is intended to be included within the scope of the claims.

We claim:

1. A polymeric condensation product of formaldehyde and an amino - hydrogen - bearing aminonitrile.

2. A polymeric condensation product of formaldehyde and an amino - hydrogen - bearing polyaminopolynitrile.

3. A polymeric condensation product of formaldehyde and an aminonitrile obtained by reacting a cyanhydrin with an amine having at least two primary amino groups.

4. A polymeric condensation product of formaldehyde and an aliphatic dinitrile in which the nitrile groups are separated by an open chain of atoms containing different secondary amino groups removed from each nitrile group by a single carbon atom.

5. A polymeric condensation product of formaldehyde and an aliphatic dinitrile of the formula

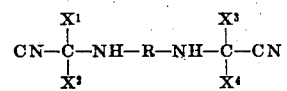

in which the X's are members of the class consisting of alkyl radicals and hydrogen, and R is a divalent acyclic radical having a chain having at least two carbon atoms between and contiguous with the amino nitrogen atoms.

6. A polymeric condensation product of formaldehyde and an N,N'-bis-(1-cyanoalkyl) aliphatic hydrocarbon disecondary diamine.

7. A polymeric condensation product of formaldehyde and an N,N'-bis-(1-cyanoalkyl) polymethylenediamine having one amino hydrogen attached to each amino nitrogen atom.

8. A polymeric condensation product of formaldehyde and an N,N'-bis-(1-cyanoalkyl) hexamethylenediamine having one amino hydrogen atom attached to each amino nitrogen atom.

9. A polymeric condensation product of formaldehyde and 2,2,11,11-tetramethyl-3,10-diazadodecanedicarboxylonitrile.

RALPH ALBERT JACOBSON.
CHARLES JOSEPH MIGHTON.

CERTIFICATE OF CORRECTION.

Patent No. 2,228,271.   January 14, 1941.

RALPH ALBERT JACOBSON, ET AL.

It is hereby certified that error appears in the printed specification of the above numbered patent requiring correction as follows: Page 1, first column, line 40, for "1-cyanolakyl" read --1-cyanoalkyl--; and second column, line 25, for "diazododecanedicarboxylonitrile" read --diazadodecanedicarboxylonitrile--; line 41, for "triazo" read --triaza--; line 51, for "tratramethyl" read --tetramethyl--; and that the said Letters Patent should be read with this correction therein that the same may conform to the record of the case in the Patent Office.

Signed and sealed this 25th day of February, A. D. 1941.

(Seal)

Henry Van Arsdale,
Acting Commissioner of Patents.